US010725740B2

(12) United States Patent
Heddes et al.

(10) Patent No.: US 10,725,740 B2
(45) Date of Patent: Jul. 28, 2020

(54) PROVIDING EFFICIENT MULTIPLICATION OF SPARSE MATRICES IN MATRIX-PROCESSOR-BASED DEVICES

(71) Applicant: QUALCOMM Incorporated, San Diego, CA (US)

(72) Inventors: Mattheus Cornelis Antonius Adrianus Heddes, Woodinville, WA (US); Robert Dreyer, Menlo Park, CA (US); Colin Beaton Verrilli, San Diego, CA (US); Natarajan Vaidhyanathan, San Diego, CA (US); Koustav Bhattacharya, Austin, TX (US)

(73) Assignee: Qualcomm Incorporated, San Diego, CA (US)

( * ) Notice: Subject to any disclaimer, the term of this patent is extended or adjusted under 35 U.S.C. 154(b) by 14 days.

(21) Appl. No.: 16/118,162

(22) Filed: Aug. 30, 2018

(65) Prior Publication Data

US 2019/0065150 A1    Feb. 28, 2019

Related U.S. Application Data

(60) Provisional application No. 62/552,913, filed on Aug. 31, 2017.

(51) Int. Cl.
  *G06F 7/544* (2006.01)
  *G06F 15/80* (2006.01)
  (Continued)

(52) U.S. Cl.
  CPC ........ *G06F 7/5443* (2013.01); *G06F 15/8015* (2013.01); *G06F 15/8053* (2013.01);
  (Continued)

(58) Field of Classification Search
  CPC .......... G06F 17/16; G06F 15/80–8023; G06F 15/8053–8061
  See application file for complete search history.

(56) References Cited

U.S. PATENT DOCUMENTS 10,360,163 B2 *  7/2019  Woo ..................... G06N 3/0454
2016/0283240 A1 *  9/2016  Mishra ................ G06F 9/30036
(Continued)

OTHER PUBLICATIONS

Han, Song et al., "EIE: Efficient Inference Engine on Compressed Deep Neural Network," arXiv preprint, arXiv:1602.01528v2, May 3, 2016, 12 pages.
(Continued)

*Primary Examiner* — Matthew D Sandifer
(74) *Attorney, Agent, or Firm* — Withrow & Terranova, PLLC (57) ABSTRACT

Providing efficient multiplication of sparse matrices in matrix-processor-based devices is disclosed herein. In one aspect, a matrix processor of a matrix-processor-based device includes a plurality of sequencers coupled to a plurality of multiply/accumulate (MAC) units for performing multiplication and accumulation operations. Each sequencer determines whether a product of an element of a first input matrix to be multiplied with an element of a second input matrix has a value of zero (e.g., by determining whether the element of the first input matrix has a value of zero, or by determining whether either the element of the first input matrix or that of the second input matrix has a value of zero). If the product of the elements of the first input matrix and the second input matrix does not have a value of zero, the sequencer provides the elements to a MAC unit to perform a multiplication and accumulation operation.

12 Claims, 9 Drawing Sheets

(51) Int. Cl.
  *G06F 17/16* (2006.01)
  *G06N 3/08* (2006.01)
  *G06N 3/04* (2006.01)
  *G06N 3/063* (2006.01)
(52) U.S. Cl.
  CPC .......... *G06F 17/16* (2013.01); *G06N 3/0445* (2013.01); *G06N 3/063* (2013.01); *G06N 3/082* (2013.01)

(56) References Cited

U.S. PATENT DOCUMENTS

2016/0358069 A1* 12/2016 Brothers ................ G06F 7/764
2019/0205358 A1* 7/2019 Diril .................... G06F 7/5443

OTHER PUBLICATIONS

Parashar, Angshuman et al., "SCNN: An Accelerator for Compressed-sparse Convolutional Neural Networks," 2017 ACM/IEEE 44th Annual International Symposium on Computer Architecture (ISCA), Jun. 24, 2017, pp. 27-40.

Morad, A. et al., "Efficient Dense and Sparse Matrix Multiplication on GP-SIMD," 2014 24th International Workshop on Power and Timing Modeling, Optimization and Simulation (PATMOS), Sep. 29, 2014, IEEE, 8 pages.

International Search Report and Written Opinion for International Patent Application No. PCT/US2018/049112, dated Dec. 20, 2018, 16 pages.

International Preliminary Report on Patentability for International Patent Application No. PCT/US2018/049112, dated Mar. 12, 2020, 10 pages.

* cited by examiner

PROVIDING EFFICIENT MULTIPLICATION OF SPARSE MATRICES IN MATRIX-PROCESSOR-BASED DEVICES

PRIORITY APPLICATION

The present application claims priority under 35 U.S.C. § 119(e) to U.S. Provisional Patent Application Ser. No. 62/552,913 entitled "PROVIDING EFFICIENT MULTIPLICATION OF SPARSE MATRICES IN PROCESSOR-BASED SYSTEMS" and filed on Aug. 31, 2017, the contents of which is incorporated herein by reference in its entirety.

BACKGROUND

I. Field of the Disclosure

The technology of the disclosure relates generally to matrix handling in matrix-processor-based devices, and, in particular, to techniques for efficient matrix multiplication.

II. Background

The field of machine learning is directed to developing and studying algorithms that can make data-driven predictions or decisions by building a model from sample inputs. Machine learning may be applied to computing tasks where designing and programming explicit algorithms with acceptable performance is difficult or impracticable. One category of machine learning techniques, known as "deep learning," employs artificial neural networks (ANNs) containing multiple hidden layers to perform tasks such as pattern analysis and classification. The ANNs are first "trained" by determining operating parameters based on examples of typical inputs and corresponding desired outputs. The ANNs may then perform "inference," in which the determined operating parameters are used to classify, recognize, and/or process new inputs.

In ANNs used for deep learning, each hidden layer within the ANN uses output from the previous layer as input. Because each layer is represented as a two-dimensional matrix, the vast majority of computational operations involved in deep learning consists of matrix multiplication operations. Such matrix multiplication operations may be carried out more efficiently using conventional techniques such as batching, and tiling/reordering matrices representing weights and activations in an ANN. However, further optimization of matrix multiplication operations has the potential to greatly improve the performance of deep learning applications.

SUMMARY OF THE DISCLOSURE

Aspects disclosed in the detailed description include providing efficient multiplication of sparse matrices in matrix-processor-based devices. In this regard, in one aspect, a matrix processor of a matrix-processor-based device is provided. The matrix processor includes a plurality of sequencers that are coupled to a plurality of multiply/accumulate (MAC) units for performing multiplication and accumulation operations. Each of the sequencers is configured to determine whether a product of an element of a first input matrix to be multiplied with an element of a second input matrix has a value of zero (0). As non-limiting examples, the sequencer may determine whether the element of the first input matrix has a value of zero (0), or may determine whether either the element of the first input matrix or the element of the second input matrix has a value of zero (0). The sequencer is further configured to, responsive to determining that product of the element of the first input matrix and the element of the second input matrix does not have a value of zero (0), provide the elements to a MAC unit to perform a multiplication and accumulation operation. If the product of the element of the first input matrix and the element of the second input matrix is determined to have a value of zero (0), the sequencer according to some aspects is configured to withhold the element of the first input matrix and the element of the second input matrix from the MAC unit. In this manner, the MAC unit only has to perform multiplication and accumulation operations on operands that are previously determined to result in a non-zero product, thus enabling the multiplication and accumulation operations to be performed on sparse matrices using fewer processor cycles.

In another aspect, a matrix-processor-based device comprising a matrix processor is provided. The matrix processor comprises a plurality of sequencers communicatively coupled to one or more MAC units of a plurality of MAC units. The matrix processor is configured to receive a first input matrix and a second input matrix, and select, by each sequencer of the plurality of sequencers, an element of the first input matrix and an element of the second input matrix to be multiplied. The matrix processor is further configured to determine, by the sequencer, whether a product of the element of the first input matrix and the element of the second input matrix will equal zero (0). The matrix processor is also configured to, responsive to determining that the product of the element of the first input matrix and the element of the second input matrix will not equal zero (0), provide, by the sequencer, the element of the first input matrix and the element of the second input matrix to a corresponding MAC unit of the plurality of MAC units. The matrix processor is additionally configured to perform, by the corresponding MAC unit, a multiplication and accumulation operation using the element of the first input matrix and the element of the second input matrix.

In another aspect, a matrix-processor-based device is provided. The matrix-processor-based device comprises a means for receiving a first input matrix and a second input matrix. The matrix-processor-based device further comprises a means for selecting an element of the first input matrix and an element of the second input matrix to be multiplied. The matrix-processor-based device also comprises a means for determining whether a product of the element of the first input matrix and the element of the second input matrix will equal zero (0). The matrix-processor-based device additionally comprises a means for performing a multiplication and accumulation operation using the element of the first input matrix and the element of the second input matrix, responsive to determining that the product of the element of the first input matrix and the element of the second input matrix will not equal zero (0).

In another aspect, a method for performing efficient multiplication of sparse matrices is provided. The method comprises receiving, by a matrix processor of a matrix-processor-based device, a first input matrix and a second input matrix. The method further comprises selecting, by each sequencer of a plurality of sequencers of the matrix processor, an element of the first input matrix and an element of the second input matrix to be multiplied. The method also comprises determining, by the sequencer, whether a product of the element of the first input matrix and the element of the second input matrix will equal zero (0). The method additionally comprises, responsive to determining that the product of the element of the first input matrix and the element of the second input matrix will not equal zero (0), providing, by the sequencer, the element of the first input matrix and the element of the second input matrix to a corresponding MAC unit of a plurality of MAC units of the matrix processor. The method further comprises performing, by the corresponding MAC unit, a multiplication and accumulation operation using the element of the first input matrix and the element of the second input matrix.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 1A:
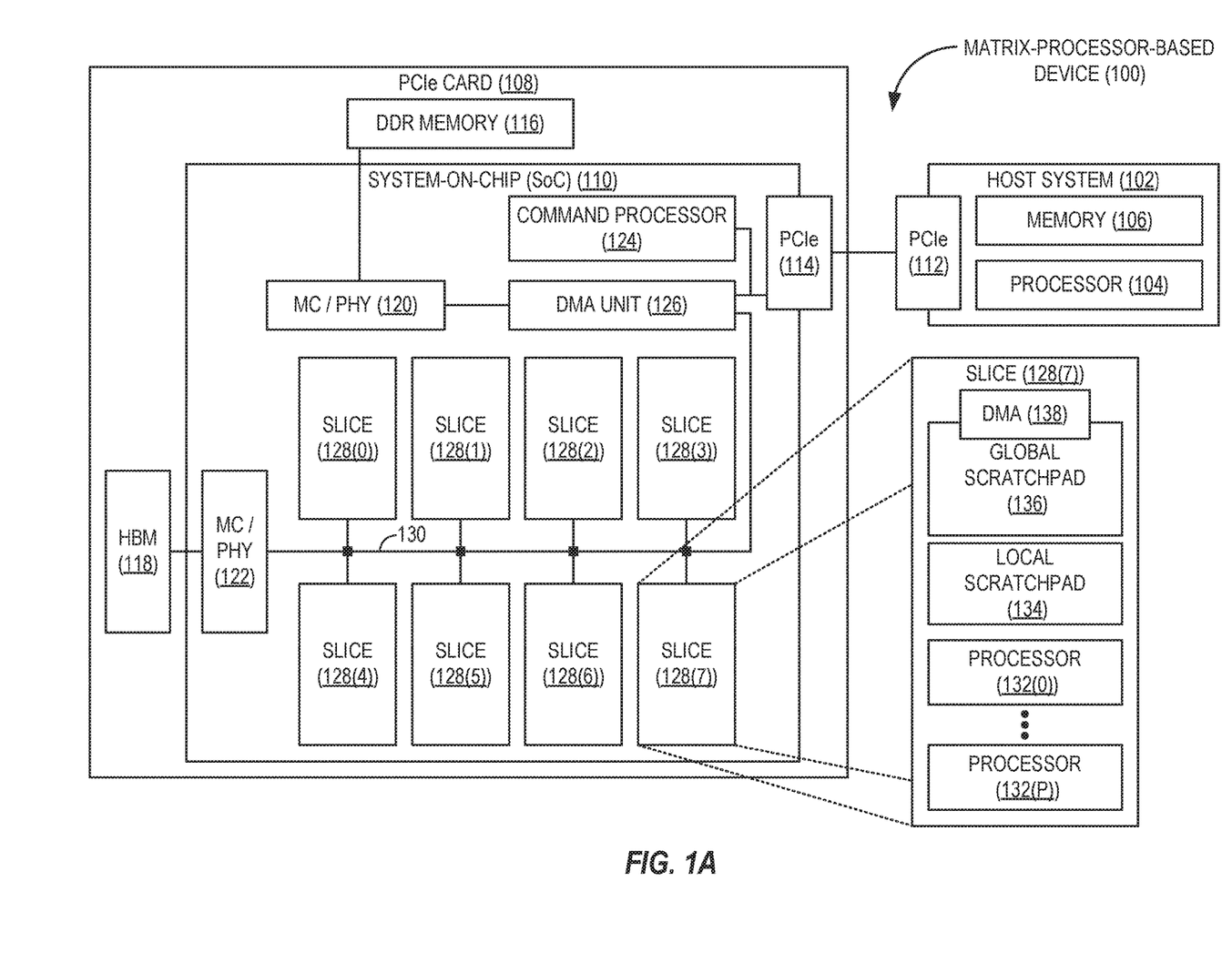
FIGS. 1A and 1B are block diagrams of an exemplary matrix-processor-based device including matrix processors configured to provide efficient multiplication of sparse matrices.
Figure 1B:
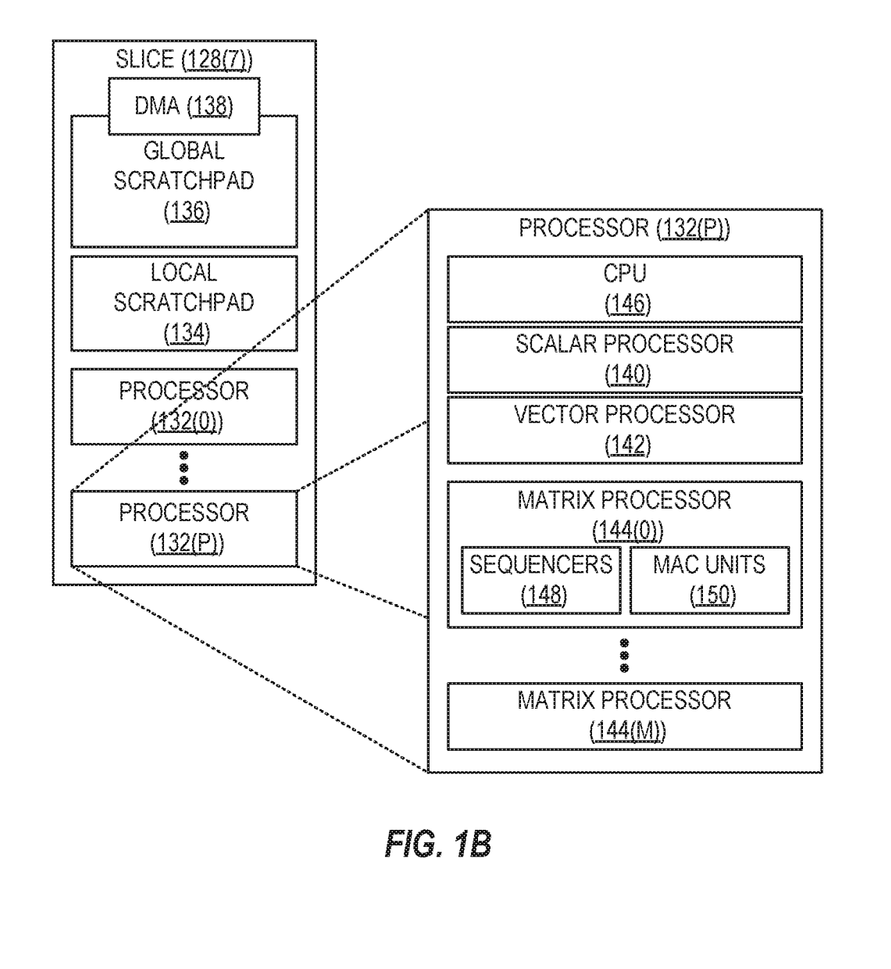

Aspects disclosed in the detailed description include providing efficient multiplication of sparse matrices in matrix-processor-based devices. In this regard, FIGS. 1A and 1B illustrate an exemplary matrix-processor-based device 100 configured to provide efficient multiplication of sparse matrices. Referring now to FIG. 1A, the matrix-processor-based device 100 provides a host system 102, which in some aspects may comprise an ARM®- or INTEL® x86-based server computer. The host system 102 includes a processor 104 (e.g., one or more central processing units (CPUs), processors, and/or processor cores) and memory 106 (e.g., double data rate (DDR) synchronous dynamic random-access memory (SDRAM) (DDR SDRAM)). The matrix-processor-based device 100 further provides a Peripheral Component Interconnect Express (PCIe) card 108, on which a system-on-chip (SoC) 110 is configured to communicate with the host system 102 via a PCIe interface 112 of the host system 102 and a PCIe interface 114 of the SoC 110. The PCIe card 108 also includes DDR memory 116 and high-bandwidth memory 118 (referred to as "HBM" in the drawings), which interface with the SoC 110 via a memory controller 120 and a memory controller 122, respectively (both of which are referred to as "MC/PHY" in the drawings).

The SoC 110 provides a command processor 124, which in some aspects may comprise a conventional processor such as an ARM®- or INTEL® x86-based processor. The SoC 110 also includes a direct memory access (DMA) unit 126 that is configured to move data to and from the DDR memory 116 and the PCIe interface 114, and thereby to and from the host system 102. The SoC 110 of FIG. 1A provides eight (8) processor slices ("slices") 128(0)-128(7), which are interconnected by a network-on-chip (NoC) 130. It is to be understood that, in some aspects, the SoC 110 may include more or fewer slices 128(0)-128(7) than illustrated in FIG. 1A.

To illustrate the constituent elements of the slices 128(0)-128(7), FIG. 1A shows an expanded view of the slice 128(7). The slice 128(7) comprises a plurality of microprocessors 132(0)-132(P), along with a local scratchpad 134 and a global scratchpad 136. The local scratchpad 134 is a higher-bandwidth memory that is accessible only by the microprocessors 132(0)-132(P) of the slice 128(7). In contrast, the global scratchpad 136 is a lower-bandwidth memory that is accessible by any of the slices 128(0)-128(7). To move data into and out of the local scratchpad 134 and the global scratchpad 136, the slice 128(7) provides a DMA unit 138, which is communicatively coupled to the NoC 130. It is to be understood that, in this example, each of the slices 128(0)-128(6) include elements corresponding to the elements of the slice 128(7) described above.

FIG. 1B provides a more detailed view of the constituent elements of the microprocessors 132(0)-132(P) of the slice 128(7) of FIG. 1A, using the microprocessor 132(P) as an example. As seen in FIG. 1B, the microprocessor 132(P) provides a scalar processor 140 and a vector processor 142. The microprocessor 132(P) further provides a plurality of matrix processors 144(0)-144(M). In the example of FIG. 1B, the matrix processors 144(0)-144(M) are configured to use 16-bit floating point precision, as higher precision is both unnecessary for machine learning applications and also results in reduced performance. The scalar processor 140, the vector processor 142, and the matrix processors 144(0)-144(M) are controlled by a CPU 146, which in some aspects provides a specialized instruction set for matrix processing. It is to be understood that, in the example of FIG. 1B, each of the microprocessors 132(0)-132(P) include elements corresponding to the elements of the microprocessor 132(P) described above.

The matrix-processor-based device 100 and its constituent elements as illustrated in FIGS. 1A and 1B may encompass any known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor sockets or packages. It is to be understood that some aspects of the matrix-processor-based device 100 may include elements in addition to those illustrated in FIGS. 1A and 1B, and/or may omit some elements illustrated in FIGS. 1A and 1B.

The matrix processors 144(0)-144(M) of FIG. 1B each are configured to perform operations such as matrix multiplication. As noted above, the vast majority of computational operations involved in applications such as deep learning consist of matrix multiplication operations. Consequently, optimization of matrix multiplication operations may provide the greatest improvements in terms of processor performance and power consumption. One potential avenue for optimization of matrix multiplication operations relates to handling of sparse matrices. For deep learning applications, the matrices used to store weights are often pruned during training. This results in matrices with a relatively high degree of sparsity matrix elements having a stored value of zero (0)). For example, fully connected layers and recurrent neural network (RNN) layers may have sparsity levels as high as 90% to 95%. The sparsity of weight matrices for convolutional layers is generally lower, but may still be in range of 30% to 60%. Accordingly, exploiting sparsity in both weight and activation matrices during matrix multiplication operations may result in faster processor speed and greater power savings.

In this regard, the matrix processors 144(0)-144(M) are configured to perform efficient matrix multiplication of sparse matrices by being configured to detect matrix elements storing a value of zero (0), and then skip operations involving those matrix elements by using processor cycles that would have been used for multiplying and adding those matrix elements to instead perform subsequent multiplication and addition operations. The matrix processors 144(0)-144(M) thus may exploit sparsity in both activation matrices and weight matrices used in deep learning applications. As discussed in greater detail below with respect to FIGS. 2-6, the matrix processors 144(0)-144(M) comprise sequencers 148 and multiply/accumulate (MAC) units 150 that are arranged in such a manner as to conserve processor cycles and power when performing matrix multiplication by only performing operations on non-zero inputs, and by activating the associated logic and registers only for those non-zero inputs. In this manner, the matrix processors 144(0)-144(M) may accelerate matrix multiplication for a wide range of sparsity levels while optimizing power consumption for all layer types (e.g., convolutional layers, fully connected layers, and recurrent neural network (RNN) layers, as non-limiting examples). In some aspect, the matrix processors 144(0)-144(M) may be implemented to achieve a balance between absolute throughput (e.g., by using more sequencers 148 and/or more MAC units 150 per matrix processor 144(0)-144(M)) and achievable maximum sparsity speedup (e.g., by using fewer sequencers 148 and/or fewer MAC units 150 per matrix processor 144(0)-144(M)). Note that the duration of the entire matrix multiplication operation is limited by the "slowest" MAC unit 150 (i.e., the MAC unit 150 that must perform the most operations).

Figure 2:
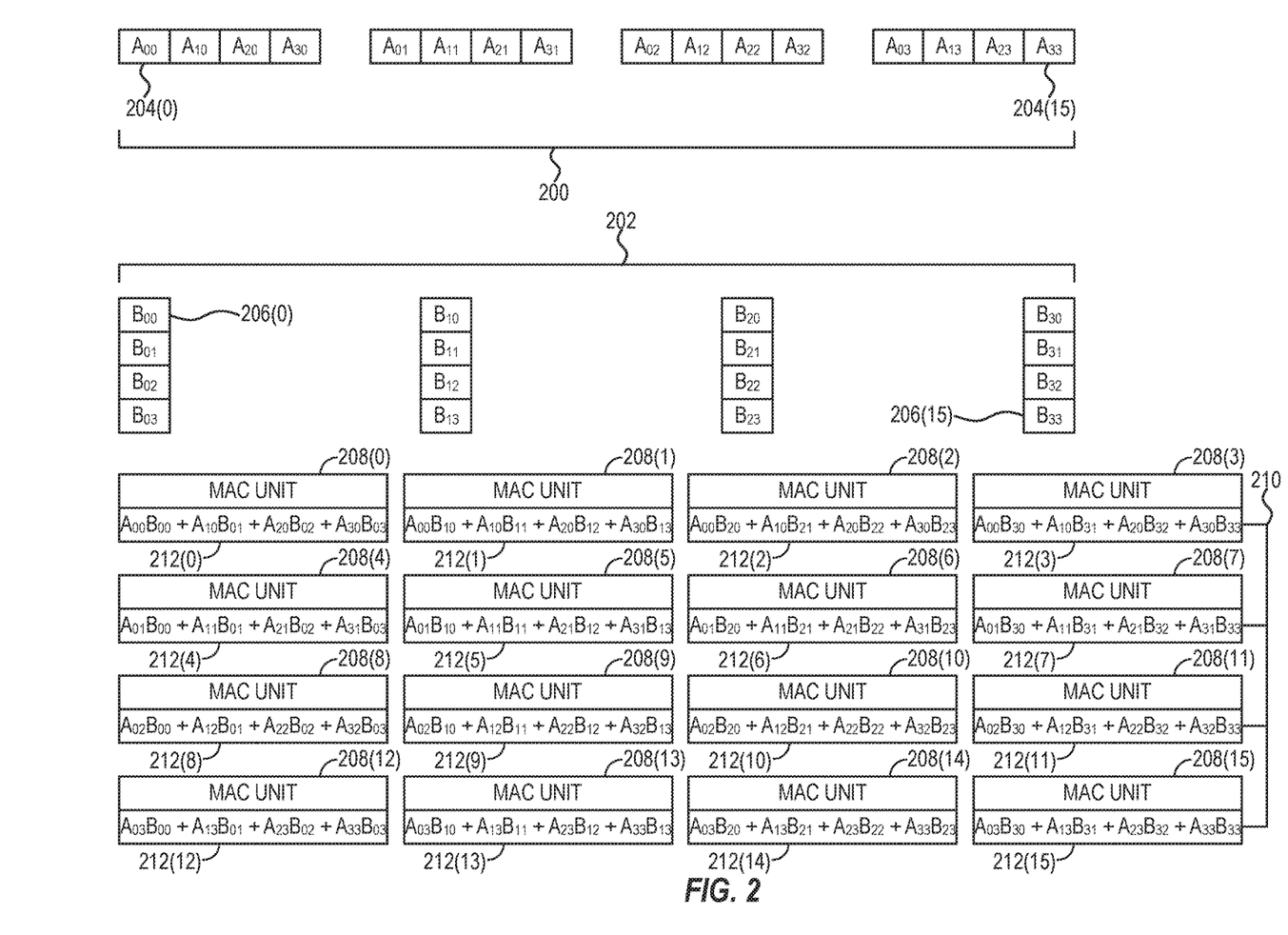
FIG. 2 is a block diagram illustrating exemplary four-by-four (4×4) matrices to be multiplied, and exemplary operations for computing each element of a resulting output matrix.

To illustrate multiplication of sparse matrices using the matrix processors 144(0)-144(M), FIGS. 2-6 are provided. FIG. 2 illustrates two (2) exemplary four-by-four (4×4) matrices to be multiplied and the operations that are carried out to generate each element of a resulting output matrix, while FIGS. 3-6 illustrate different mechanisms by which efficient multiplication of the matrices shown in FIG. 2 may be accomplished.

Referring now to FIG. 2, an exemplary pair of input matrices 200, 202, which may be received and multiplied by one of the matrix processors 144(0)-144(M) of FIG. 1B, is shown. In the example of FIG. 2, each of the input matrices 200, 202 comprise 16 elements 204(0)-204(15) and 206(0)-206(15), respectively. The elements 204(0)-204(15) and 206(0)-206(15) of each of the input matrices 200, 202 are arranged in four rows and four columns, and thus the input matrices 200, 202 may be referred to as "4×4" matrices. In the input matrix 200 (also referred to herein as the "first input matrix 200"), the first digit of the subscript of each element 204(0)-204(15) indicates the column of the element 204(0)-204(15), while the second digit indicates the row of the element 204(0)-204(15). Similarly, the input matrix 202 (also referred to as the "second input matrix 202") has its elements 206(0)-206(15) arranged such that the first digit of the subscript of each element 206(0)-206(15) indicates the column of the element 206(0)-206(15), while the second digit indicates the row of the element 206(0)-206(15). For the sake of clarity, the elements 204(0)-204(15) and the elements 206(0)-206(15) may be referred to herein by their shorthand designations shown in FIG. 2 (e.g., $A_{00}$, $B_{23}$, etc.) It is to be understood that, in actual implementation, the input matrices 200, 202 may include more or fewer rows and/or columns than those illustrated in FIG. 2. For example, the input matrices 200, 202 each may comprise 32 rows and 32 columns, and thus may be considered 32×32 matrices.

FIG. 2 further illustrates 16 MAC units 208(0)-208(15), which may be provided by each of the matrix processors 144(0)-144(M). Each of the MAC units 208(0)-208(15) is configured to compute the product of two numbers and then add the result to an accumulator, thus generating an output matrix 210 comprising elements 212(0)-212(15). The specific operations performed by each of the MAC units 208(0)-208(15) to perform matrix multiplication of the input matrices 200, 202 is shown within the elements 212(0)-212(15), beneath the corresponding MAC units 208(0)-208(15). For example, the MAC unit 208(0) generates an output value by summing the products of elements $A_{00}$ and $B_{00}$, elements $A_{10}$ and $B_{01}$, elements $A_{20}$ and $B_{02}$, and elements $A_{30}$ and $B_{03}$. Multiplication of the 4×4 input matrices 200, 202 using the 16 MAC units 208(0)-208(15) requires 64 individual multiplication operations that consume four (4) processor cycles. Larger matrices require correspondingly more individual operations and processor cycles. For instance, multiplying 32×32 matrices using 1,024 MAC units would require 32,768 individual multiplication operations that consume 32 processor cycles.

Figure 3:
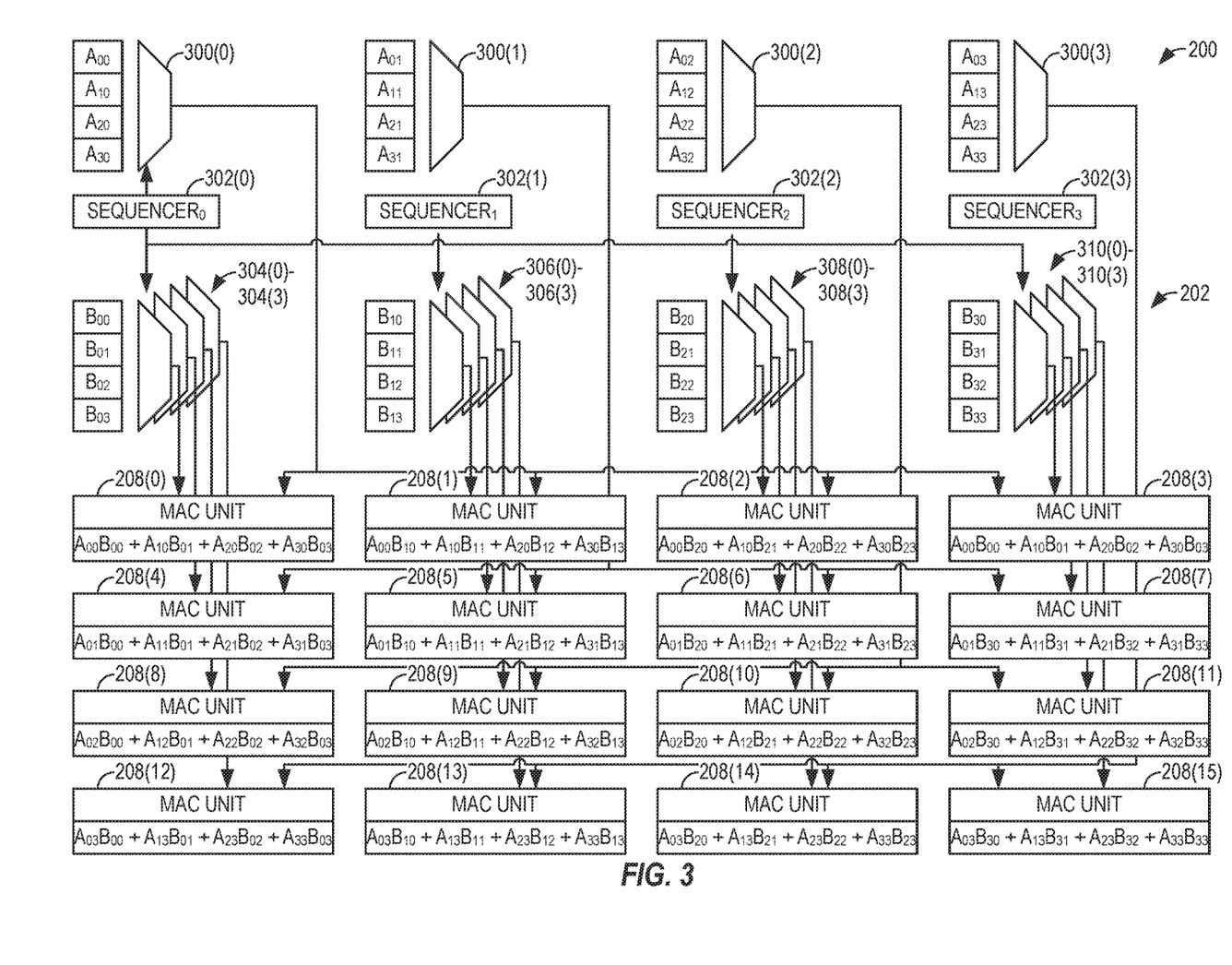
FIG. 3 is a block diagram illustrating an exemplary aspect for exploiting sparsity in a first input matrix when performing matrix multiplication operations.

In FIG. 3, an exemplary aspect for exploiting sparsity in the input matrix 200 of FIG. 2 when performing matrix multiplication is illustrated. As seen in FIG. 3, the rows of the input matrix 200 are associated with multiplexors 300(0)-300(3), which in turn are coupled to sequencers 302(0)-302(3) (corresponding in functionality to the sequencers 148 of FIG. 1B). Note that, in this example, the number of sequencers 302(0)-302(3) equals the number of rows in the output matrix 210 of FIG. 2 (which also equals the number of rows in the input matrix 200). The elements of the input matrix 202 are associated with multiplexors 304(0)-304(3), 306(0)-306(3), 308(0)-308(3), and 310(0)-310(3). Each group of multiplexors 304(0)-304(3), 306(0)-306(3), 308(0)-308(3), and 310(0)-310(3) is coupled to the MAC units 208(0)-208(15) (which in this example correspond in number to the number of elements 212(0)-212(15) in the output matrix 210 of FIG. 2). For example, the multiplexors 304(0)-304(3) are coupled to the MAC units 208(0), 208(4), 208(8), and 208(12), respectively. The output of each of the sequencers 302(0)-302(3) is fanned out to the corresponding group of multiplexors 304(0)-304(3), 306(0)-306(3), 308(0)-308(3), and 310(0)-310(3) as selector values.

In the example of FIG. 3, the sequencer 302(0) is coupled to the multiplexor 300(0) associated with the first row of the input matrix 200, and is also coupled to the multiplexors 304(0)-304(3) associated with the first row of the input matrix 202. The sequencer 302(0) is further coupled to the MAC units 208(0)-208(3), each of which takes an element of the first row of the input matrix 200 (i.e., elements $A_{00}$, $A_{10}$, $A_{20}$, and $A_{30}$) as an operand when performing matrix multiplication. Although omitted from FIG. 3 for the sake of clarity, it is to be understood that the sequencers 302(1)-302(3) are similarly coupled to the multiplexors 300(1)-300(3) and the multiplexors 306(0)-306(3), 308(0)-308(3), and 310(0)-310(3).

When performing a matrix multiplication operation, the sequencer 302(0) is configured to supply the MAC units 208(0)-208(3) with the operands needed to calculate the corresponding output values. The sequencer 302(0) selects an element of the input matrix 200 and an element of the input matrix 202 to be multiplied. To optimize the matrix multiplication operation, the sequencer 302(0) determines whether the product of the element of the input matrix 200 and the element of the input matrix 202 will equal zero (0). In the example of FIG. 3, the sequencer 302(0) makes this determination by determining which of the elements of the first row of the input matrix 200 equals zero (0), if any. For each element having a value of zero (0), the sequencer 302(0) withholds providing those operands to the MAC units 208(0)-208(3), while providing operands with a non-zero product to the corresponding MAC units 208(0)-208(3). This has the effect of reducing the number of calculations that must be performed by the MAC units 208(0)-208(3) when the input matrix 200 contains values of zero (0). For example, if elements $A_{00}$ and $A_{10}$ each have a value of zero (0), the sequencer 302(0) will provide only the operands $A_{20}$ and $B_{02}$ to the MAC unit 208(0) in one processor cycle, followed by the operands $A_{30}$ and $B_{03}$ in the next processor cycle. This reduces by half the number of individual calculations that the MAC unit 208(0) must perform to multiply the input matrices 200, 202.

Figure 4:
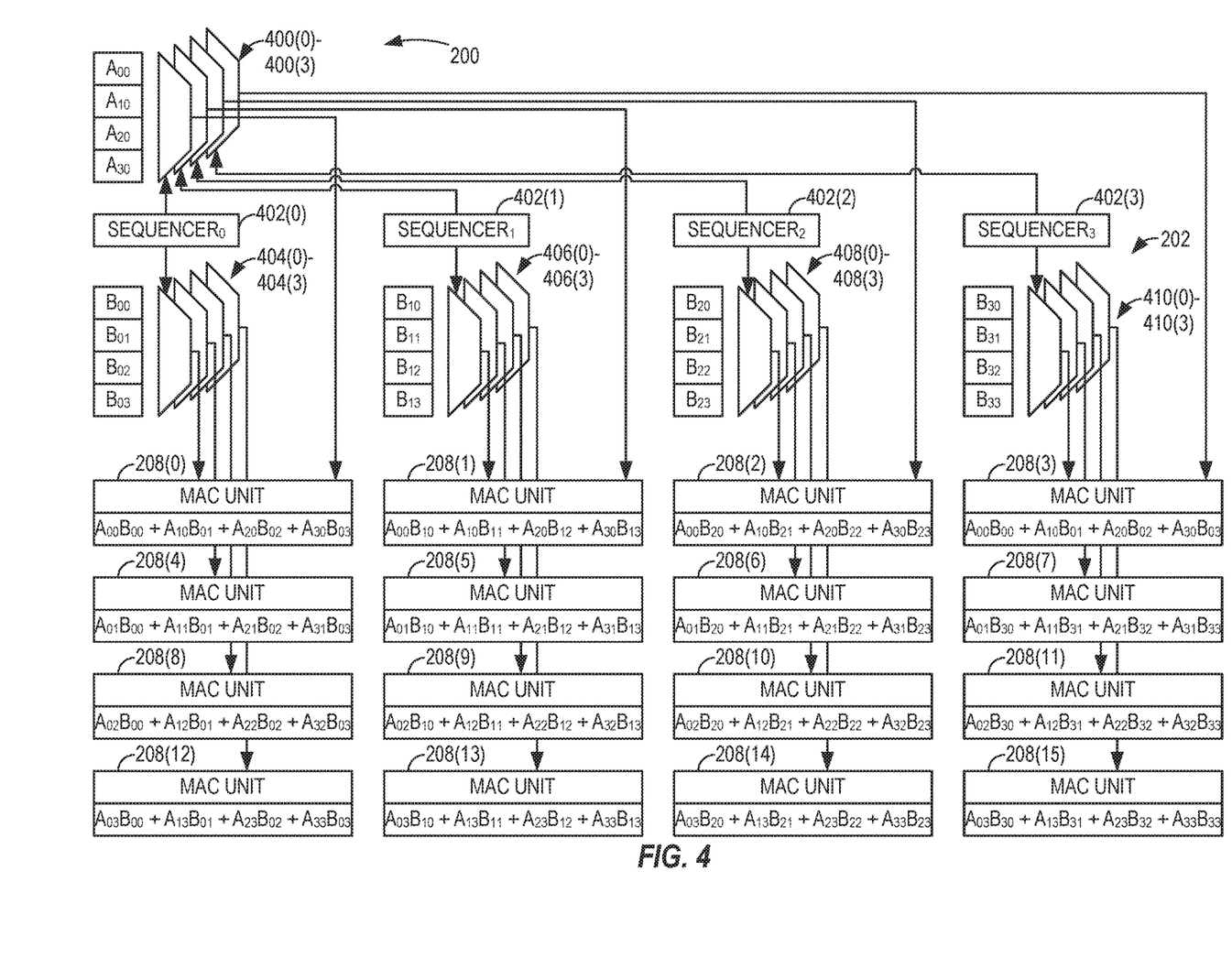
FIG. 4 is a block diagram illustrating an exemplary aspect for exploiting sparsity in both a first input matrix and a second input matrix when performing matrix multiplication operations.

To illustrate an exemplary aspect in which sparsity in both input matrices 200, 202 may be exploited to optimize matrix multiplication, FIG. 4 is provided. In FIG. 4, the input matrices 200, 202 and the MAC units 208(0)-208(15) of FIG. 2 are shown. The elements of the first row of the input matrix 200 are associated with corresponding multiplexors 400(0)-400(3), which are coupled to sequencers 402(0)-402(3), respectively. The sequencers 402(0)-402(3) in turn are coupled to multiplexors 404(0)-404(3), 406(0)-406(3), 408(0)-408(3), and 410(0)-410(3) associated with corresponding columns of the input matrix 202. It is to be understood that each of the other rows of the input matrix 200 (which are not shown in FIG. 4 for the sake of clarity) is similarly associated with multiplexors and sequencers, resulting in a number of sequencers equal to the number of elements 212(0)-212(15) of the output matrix 210 of FIG. 2. The multiplexors 400(0)-400(3) are further coupled to the MAC units 208(0)-208(3), each of which takes an element of the first row of the input matrix 200 (i.e., elements $A_{00}$, $A_{10}$, $A_{20}$, and $A_{30}$) as an operand when performing matrix multiplication. The elements of the input matrix 202 are associated with the multiplexors 404(0)-404(3), 406(0)-406(3), 408(0)-408(3), and 410(0)-410(3), with each of the multiplexors 404(0)-404(3), 406(0)-406(3), 408(0)-408(3), and 410(0)-410(3) coupled to one of the MAC units 208(0)-208(15) corresponding to the associated columns of the input matrix 202.

As with the sequencer 302(0) of FIG. 3, the sequencers 402(0)-402(3) are configured to supply the MAC units 208(0)-208(3) with the operands needed to calculate the corresponding output values. However, in contrast to the sequencers 302(0)-302(3) of FIG. 3, the sequencers 402(0)-402(3) determine whether either elements of the first row of the input matrix 200 or the first column of the input matrix 202 equals zero (0), if any. If either an operand from the first row of the input matrix 200 or a corresponding operand from the first column of the input matrix 202 has a value of zero (0), those operands are subsequently withdrawn by the sequencers 402(0)-402(3) when providing operands to the MAC units 208(0)-208(3). As a result, the number of computations that must be performed by the MAC units 208(0)-208(3) may consume as few as zero (0) processor cycles or as many as four (4) processor cycles.

Figure 5:
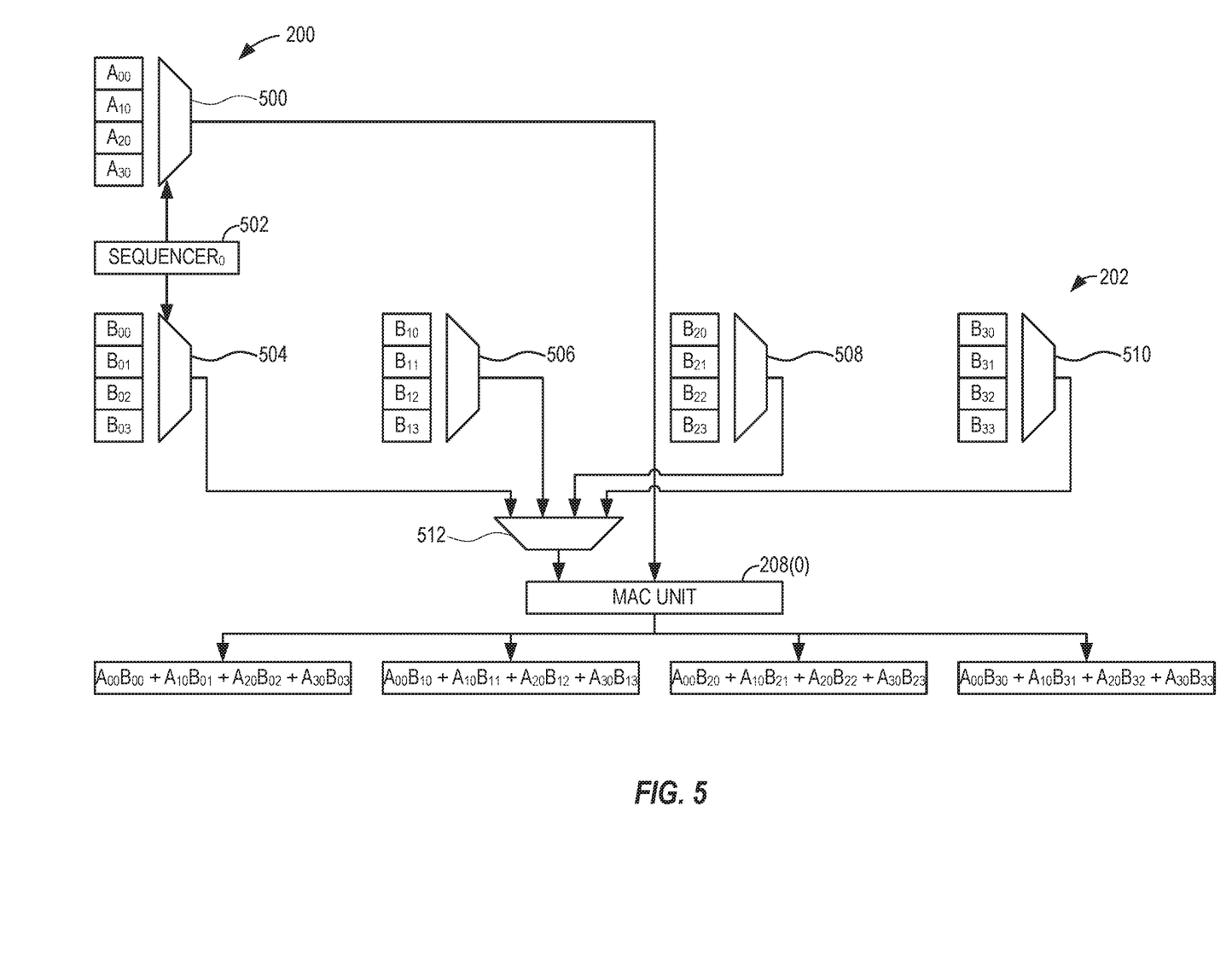
FIG. 5 is a block diagram illustrating an exemplary aspect for exploiting matrix sparsity when performing matrix multiplication using fewer multiply/accumulate (MAC) units.

Further aspects of the matrix processors 144(0)-144(M) of FIG. 1B may be configured to exploit matrix sparsity when performing matrix multiplication using more or fewer of the MAC units 208(0)-208(15) of FIGS. 2-4. In this regard, FIG. 5 illustrates one aspect in which fewer MAC units 208(0)-208(15) are employed. As seen in FIG. 5, the first row of the input matrix 200 of FIG. 2 is associated with a multiplexor 500, which is coupled to a sequencer 502 and the MAC unit 208(0). The columns of the input matrix 202 are also associated with multiplexors 504-510, each of which is coupled to a multiplexor 512. The multiplexor 512 is then coupled to the MAC unit 208(0). In this example, the MAC unit 208(0) performs the operations required for four (4) of the output elements. It is to be understood that the other rows of the input matrix 200, which are omitted from FIG. 5 for the sake of clarity, are likewise each associated with a multiplexor that is coupled to a sequencer and a MAC unit. Thus, a total of four (4) MAC units 208(0)-208(3) would be used in the aspect depicted. Note that, in this example, the number of MAC units 208(0)-208(3) and associated sequencers is equal to the number of rows in the output matrix 210 of FIG. 2.

Figure 6:
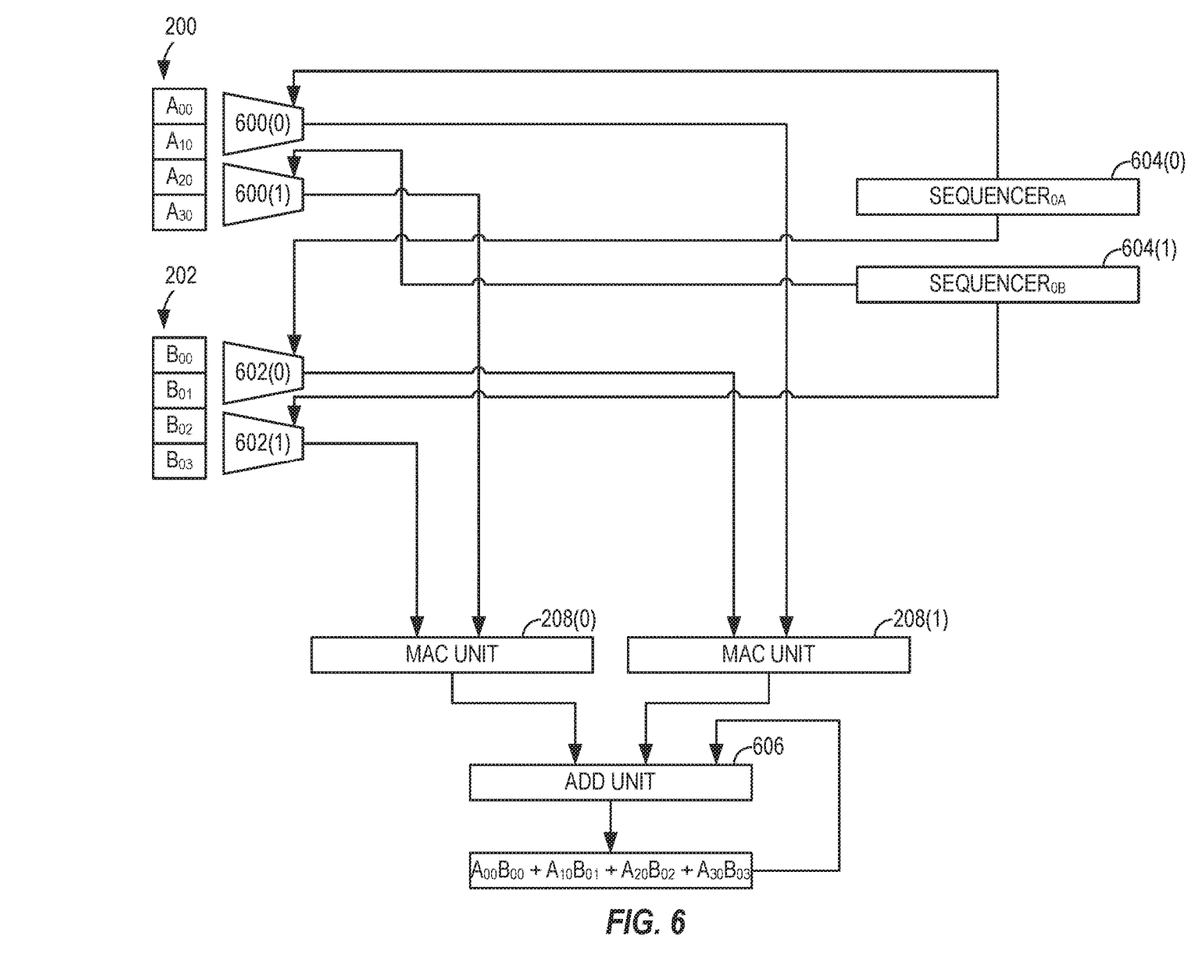
FIG. 6 is a block diagram illustrating an exemplary aspect for exploiting matrix sparsity when performing matrix multiplication using more MAC units.

FIG. 6 illustrates an aspect in which two MAC units 208(0)-208(1) are used to process the contents of the first row of the input matrix 200 and the first column of the input matrix 202. The first row of the input matrix 200 is associated with two multiplexors 600(0)-600(1), which are coupled to the MAC units 208(0)-208(1), respectively. Likewise, the first column of the input matrix 202 is associated with two multiplexors 602(0)-602(1), which in turn are coupled to the corresponding MAC units 208(0)-208(1). A first sequencer 604(0) is coupled to the multiplexors 600(0) and 602(1), while a second sequencer 604(1) is coupled to the multiplexors 600(1) and 602(1). In the example of FIG. 6, an add unit 606 is also provided to sum the outputs of the MAC units 208(0)-208(1). The other rows of the input matrix 200 and the columns of the input matrix 202 (omitted from FIG. 6 for the sake of clarity) are similarly associated with pairs of multiplexors, sequencers, and MAC units. Consequently, in this example, the total number of MAC units is equal to the twice number of elements in the output matrix 210 of FIG. 2, and the total number of associated sequencers is equal to the twice number of columns in the input matrix 200 of FIG. 2.

Figure 7:
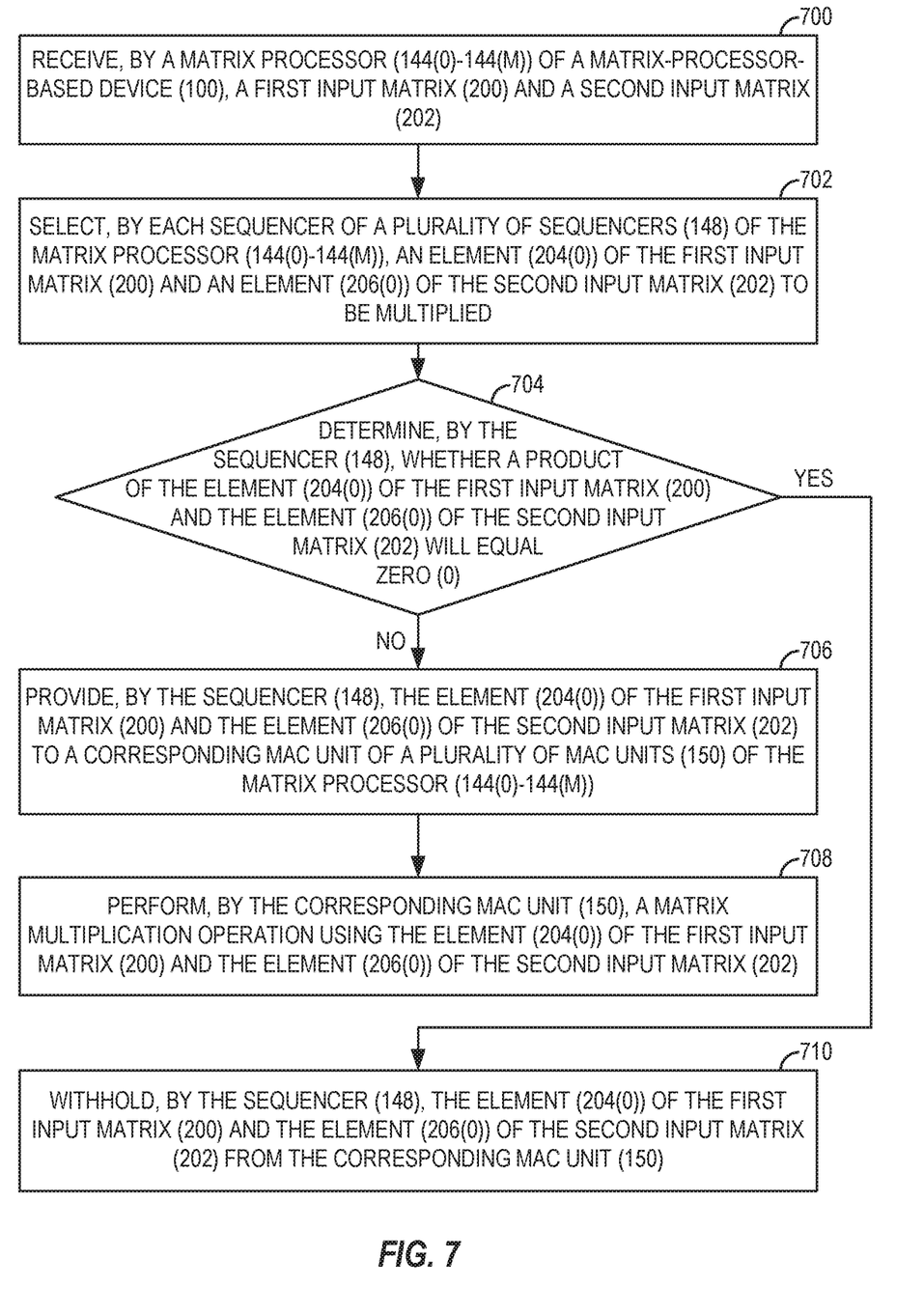
FIG. 7 is a flowchart illustrating exemplary operations of the matrix-processor-based device of FIG. 1 for performing efficient multiplication of sparse matrices.

To illustrate exemplary operations of the matrix-processor-based device 100 of FIGS. 1A and 1B for performing efficient multiplication of sparse matrices, FIG. 7 is provided. For the sake of clarity, elements of FIGS. 1B and 2 are referenced in describing FIG. 7. Operations in FIG. 7 begin with a matrix processor, such as one of the matrix processors 144(0)-144(M), receiving the first input matrix 200 and the second input matrix 202 (block 700). In this regard, the matrix processor 144(0)-144(M) may be referred to herein as "a means for receiving a first input matrix and a second input matrix." Each sequencer of the plurality of sequencers 148 of the matrix processor 144(0)-144(M) selects an element, such as the element 204(0) of the first input matrix 200, and an element, such as the element 206(0)

of the second input matrix 202, to be multiplied (block 702). Accordingly, the sequencer 148 may be referred to herein as "a means for selecting an element of the first input matrix and an element of the second input matrix to be multiplied."

The sequencer 148 then determines whether a product of the element 204(0) of the first input matrix 200 and the element 206(0) of the second input matrix 202 will equal zero (0) (block 704). The sequencer 148 thus may be referred to herein as "a means for determining whether a product of the element of the first input matrix and the element of the second input matrix will equal zero (0)." In some aspects, operations of decision block 704 may include the sequencer 148 determining whether the element 204(0) of the first input matrix 200 has a value of zero (0) (e.g., in aspects that are concerned primarily with sparsity of the first input matrix 200). Some aspects may provide that operations of decision block 704 may include the sequencer 148 determining whether either of the element 204(0) of the first input matrix 200 and the element 206(0) of the second input matrix 202 has a value of zero (0) (e.g., in aspects directed to handling sparsity of both the first input matrix 200 and the second input matrix 202).

If the sequencer 148 determines at decision block 704 that the product of the element 204(0) of the first input matrix 200 and the element 206(0) of the second input matrix 202 will not equal zero (0), the sequencer 148 provides the element 204(0) of the first input matrix 200 and the element 206(0) of the second input matrix 202 to a corresponding MAC unit of a plurality of MAC units 150 of the matrix processor 144(0)-144(M) (block 706). The corresponding MAC unit 150 then performs a multiplication and accumulation operation using the element 204(0) of the first input matrix 200 and the element 206(0) of the second input matrix 202 (block 708). Accordingly, the MAC unit 150 may be referred to herein as "a means for performing a multiplication and accumulation operation using the element of the first input matrix and the element of the second input matrix, responsive to determining that the product of the element of the first input matrix and the element of the second input matrix will not equal zero (0)."

However, if it is determined at decision block 704 that the product of the element 204(0) of the first input matrix 200 and the element 206(0) of the second input matrix 202 will equal zero (0), the sequencer 148 withholds the element 204(0) of the first input matrix 200 and the element 206(0) of the second input matrix 202 from the corresponding MAC unit 150 (block 710). The sequencer 148 thus may be referred to herein as "a means for withholding the element of the first input matrix and the element of the second input matrix, responsive to determining that the product of the element of the first input matrix and the element of the second input matrix will equal zero (0)." By withholding the element 204(0) of the first input matrix 200 and the element 206(0) of the second input matrix 202 from the corresponding MAC unit 150, the sequencer 148 enables the MAC unit 150 to complete the series of multiplication and accumulation operations in fewer processor cycles by bypassing multiplication of matrix elements for which the product is known to be zero (0).

Providing efficient multiplication of sparse matrices in matrix-processor-based devices according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 8:
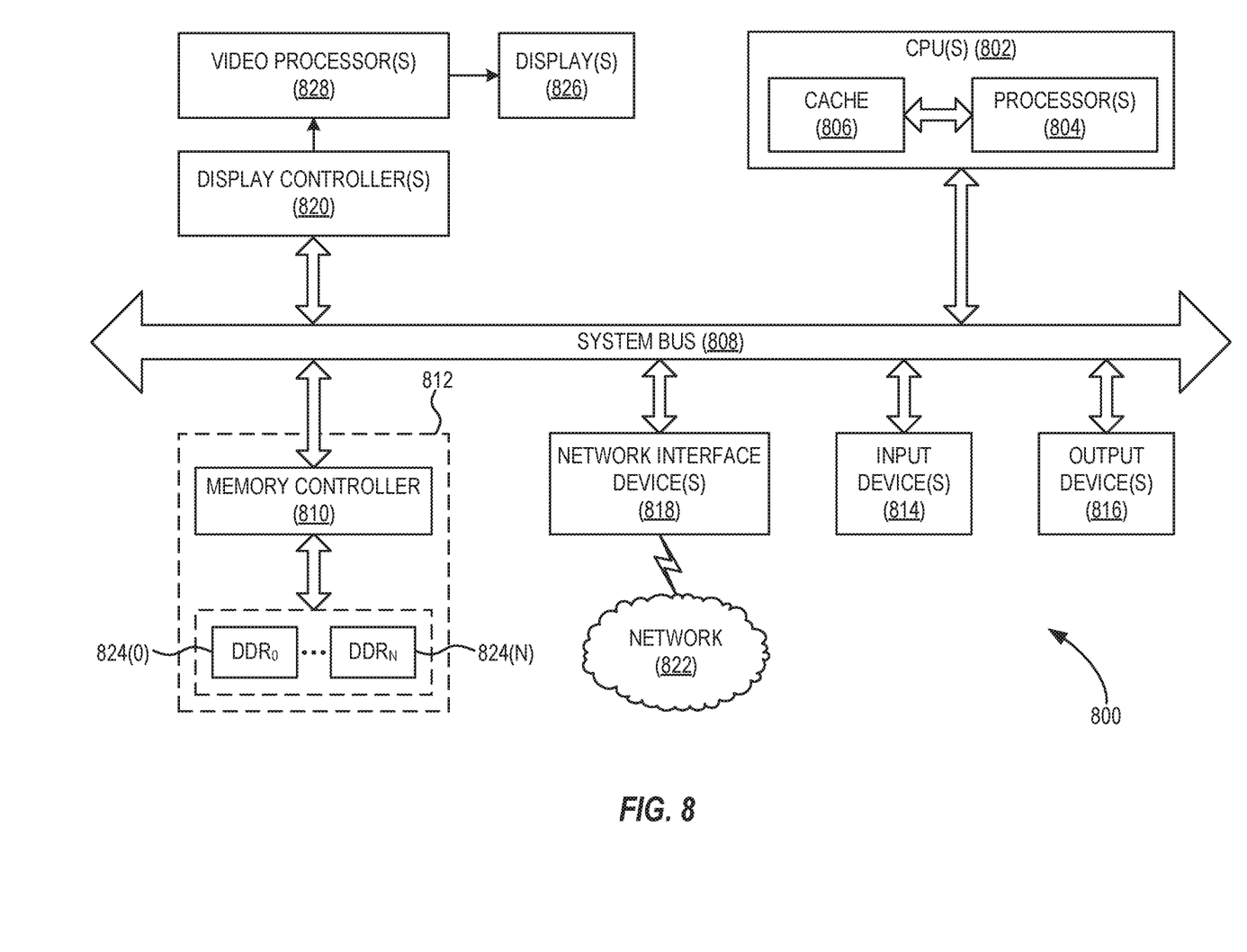
FIG. 8 is a block diagram of an exemplary processor-based device that can comprise the matrix processors of FIGS. 1A and 1B for providing efficient multiplication of sparse matrices in matrix-processor-based devices.

In this regard, FIG. 8 illustrates an example of a processor-based system 800 that may comprise the matrix-processor-based device 100 of FIG. 1A. The processor-based system 800 includes one or more CPUs 802, each including one or more processors 804. In some aspects, the processors 804 may comprise the matrix processors 144(0)-144(M) of FIG. 1B. The CPU(s) 802 may have cache memory 806 coupled to the processor(s) 804 for rapid access to temporarily stored data. The CPU(s) 802 is coupled to a system bus 808 and can intercouple master and slave devices included in the processor-based system 800. As is well known, the CPU(s) 802 communicates with these other devices by exchanging address, control, and data information over the system bus 808. For example, the CPU(s) 802 can communicate bus transaction requests to a memory controller 810 as an example of a slave device.

Other master and slave devices can be connected to the system bus 808. As illustrated in FIG. 8, these devices can include a memory system 812, one or more input devices 814, one or more output devices 816, one or more network interface devices 818, and one or more display controllers 820, as examples. The input device(s) 814 can include any type of input device, including, but not limited to, input keys, switches, voice processors, etc. The output device(s) 816 can include any type of output device, including, but not limited to, audio, video, other visual indicators, etc. The network interface device(s) 818 can be any devices configured to allow exchange of data to and from a network 822. The network 822 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 818 can be configured to support any type of communications protocol desired. The memory system 812 can include one or more memory units 824(0)-824(N).

The CPU(s) 802 may also be configured to access the display controller(s) 820 over the system bus 808 to control information sent to one or more displays 826. The display controller(s) 820 sends information to the display(s) 826 to be displayed via one or more video processors 828, which process the information to be displayed into a format suitable for the display(s) 826. The display(s) 826 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A matrix-processor-based device comprising a matrix processor, wherein:
    the matrix processor comprises a plurality of sequencers communicatively coupled to one or more multiply/accumulate (MAC) units of a plurality of MAC units; and
    the matrix processor is configured to:
        receive a first input matrix and a second input matrix;
        select, by each sequencer of the plurality of sequencers, an element of the first input matrix and an element of the second input matrix to be multiplied;
        determine, by the sequencer, whether a product of the element of the first input matrix and the element of the second input matrix will equal zero (0); and
        responsive to determining that the product of the element of the first input matrix and the element of the second input matrix will not equal zero (0):
            provide, by the sequencer, the element of the first input matrix and the element of the second input matrix to a corresponding MAC unit of the plurality of MAC units; and
            perform, by the corresponding MAC unit, a multiplication and accumulation operation using the element of the first input matrix and the element of the second input matrix;
        wherein:
            the plurality of MAC units comprises a number of MAC units at least equal to a number of rows in an output matrix resulting from multiplying the first input matrix and the second input matrix; and
            the plurality of sequencers comprises a number of sequencers at least equal to the number of rows in the output matrix.

2. The matrix-processor-based device of claim 1, wherein the matrix processor is further configured to, responsive to determining that the product of the element of the first input matrix and the element of the second input matrix will equal zero (0), withhold, by the sequencer, the element of the first input matrix and the element of the second input matrix from the corresponding MAC unit.

3. The matrix-processor-based device of claim 1, wherein the plurality of MAC units comprises a number of MAC units equal to a number of elements in the output matrix resulting from multiplying the first input matrix and the second input matrix.

4. The matrix-processor-based device of claim 3, wherein:
    the plurality of sequencers comprises a number of sequencers equal to the number of rows in the output matrix; and
    the matrix processor is configured to determine whether the product of the element of the first input matrix and the element of the second input matrix will equal zero (0) by being configured to determine, by the sequencer of the plurality of sequencers, whether the element of the first input matrix has a value of zero (0).

5. The matrix-processor-based device of claim 3, wherein:
the plurality of sequencers comprises a number of sequencers equal to a number of elements in the output matrix; and
the matrix processor is configured to determine whether the product of the element of the first input matrix and the element of the second input matrix will equal zero (0) by being configured to determine, by the sequencer of the plurality of sequencers, whether either of the element of the first input matrix and the element of the second input matrix has a value of zero (0).

6. The matrix-processor-based device of claim 1, wherein:
the plurality of MAC units comprises a number of MAC units equal to twice a number of elements in the first output matrix; and
the plurality of sequencers comprises a number of sequencers equal to twice the number of rows in the first input matrix.

7. The matrix-processor-based device of claim 1 integrated into an integrated circuit (IC).

8. A method for performing efficient multiplication of sparse matrices, comprising:
receiving, by a matrix processor of a matrix-processor-based device, a first input matrix and a second input matrix;
selecting, by each sequencer of a plurality of sequencers of the matrix processor, an element of the first input matrix and an element of the second input matrix to be multiplied;
determining, by the sequencer, whether a product of the element of the first input matrix and the element of the second input matrix will equal zero (0); and
responsive to determining that the product of the element of the first input matrix and the element of the second input matrix will not equal zero (0):
providing, by the sequencer, the element of the first input matrix and the element of the second input matrix to a corresponding multiply/accumulate (MAC) unit of a plurality of MAC units of the matrix processor; and
performing, by the corresponding MAC unit, a multiplication and accumulation operation using the element of the first input matrix and the element of the second input matrix;
wherein:
the plurality of MAC units comprises a number of MAC units at least equal to a number of rows in an output matrix resulting from multiplying the first input matrix and the second input matrix; and
the plurality of sequencers comprises a number of sequencers at least equal to the number of rows in the output matrix.

9. The method of claim 8, further comprising, responsive to determining that the product of the element of the first input matrix and the element of the second input matrix will equal zero (0), withholding, by the sequencer, the element of the first input matrix and the element of the second input matrix from the corresponding MAC unit.

10. The method of claim 8, wherein the plurality of MAC units comprises a number of MAC units equal to a number of elements in the output matrix resulting from multiplying the first input matrix and the second input matrix.

11. The method of claim 10, wherein:
the plurality of sequencers comprises a number of sequencers equal to the number of rows in the output matrix; and
determining whether the product of the element of the first input matrix and the element of the second input matrix will equal zero (0) comprises determining, by the sequencer of the plurality of sequencers, whether the element of the first input matrix has a value of zero (0).

12. The method of claim 10, wherein:
the plurality of sequencers comprises a number of sequencers equal to a number of elements in the output matrix; and
determining whether the product of the element of the first input matrix and the element of the second input matrix will equal zero (0) comprises determining, by the sequencer of the plurality of sequencers, whether either of the element of the first input matrix and the element of the second input matrix has a value of zero (0).

\* \* \* \* \*